United States Patent [19]

Schwengel

[11] Patent Number: 5,120,160
[45] Date of Patent: Jun. 9, 1992

[54] METHOD AND APPARATUS FOR CONFINING AND RECLAIMING HYDROCARBON CONTAMINATED LAND SITES

[75] Inventor: Erich Schwengel, Palm City, Fla.

[73] Assignee: Environmental Reclamation Systems, Inc., Port St. Lucie, Fla.

[21] Appl. No.: 489,174

[22] Filed: Mar. 5, 1990

[51] Int. Cl.⁵ .............................................. B09B 3/00
[52] U.S. Cl. ................................... 405/128; 405/129
[58] Field of Search ............... 405/128, 129; 166/245, 166/246

[56] References Cited

U.S. PATENT DOCUMENTS

| | | |
|---|---|---|
| 2,769,750 | 11/1956 | Harris . |
| 2,813,821 | 11/1957 | Updegraff . |
| 3,152,983 | 10/1964 | Davis et al. . |
| 3,224,946 | 12/1965 | Raymond . |
| 3,306,447 | 2/1967 | Medeiros . |
| 3,449,247 | 6/1969 | Bauer . |
| 3,470,091 | 9/1969 | Budd et al. . |
| 3,616,204 | 10/1971 | Linn . |
| 3,634,227 | 1/1972 | Patterson . |
| 3,705,851 | 12/1972 | Brauer ................................. 210/747 |
| 3,769,164 | 10/1973 | Azarowicz . |
| 3,843,517 | 10/1974 | McKinney et al. . |
| 3,846,290 | 11/1974 | Raymond . |
| 3,856,667 | 11/1974 | Azarowicz . |
| 3,870,599 | 3/1975 | Azarowicz . |
| 3,871,956 | 3/1975 | Azarowicz . |
| 3,871,957 | 3/1975 | Mohan et al. . |
| 4,050,907 | 9/1977 | Brimhall . |
| 4,086,167 | 4/1978 | Tapola et al. . |
| 4,171,921 | 10/1979 | Morfeldt ............................. 405/128 |
| 4,194,855 | 3/1980 | Egger . |
| 4,201,663 | 5/1980 | Rollag et al. . |
| 4,288,174 | 9/1981 | Laws . |
| 4,296,884 | 10/1981 | Luebke . |
| 4,297,122 | 10/1981 | Wallace . |
| 4,333,831 | 6/1982 | Petzinger . |
| 4,385,121 | 5/1983 | Knowlton . |
| 4,396,402 | 8/1983 | Ghosh ................................. 405/129 |
| 4,401,569 | 8/1983 | Jhaveri et al. . |
| 4,404,516 | 9/1983 | Johnson, Jr. ........................ 405/128 |
| 4,414,333 | 11/1983 | Olivieri et al. . |
| 4,415,661 | 11/1983 | Thirumalacher et al. . |
| 4,415,662 | 11/1983 | Thirumalachar et al. . |
| 4,469,176 | 9/1984 | Zison et al. . |
| 4,493,895 | 1/1985 | Colaruotolo et al. . |
| 4,521,515 | 6/1985 | Hata . |
| 4,584,102 | 4/1986 | Bogart et al. . |
| 4,624,604 | 11/1986 | Wagner et al. ..................... 405/128 |
| 4,637,462 | 1/1987 | Grable ............................... 405/129 |
| 4,670,148 | 6/1987 | Schneider . |
| 4,678,582 | 7/1987 | Lavigne . |
| 4,713,343 | 12/1987 | Wilson, Jr. et al. . |
| 4,765,902 | 8/1988 | Ely et al. ............................ 405/129 |
| 4,849,360 | 7/1989 | Norris et al. . |
| 4,850,745 | 7/1989 | Hater et al. ......................... 405/53 |

Primary Examiner—Wayne Langel
Attorney, Agent, or Firm—Robert W. Duckworth

[57] ABSTRACT

A process for bio-remediation of soil contaminated with organic compounds and containment of the contamination, utilizes a group of veil wells disposed along the limits of the contamination and downgradient of groundwater flow. Contamination consuming bacteria and water are injected into the soil to form a curtain of bacteria for presenting spread of contamination. Areas of heavy concentration of contaminants are excavated, bio-remediation of areas of lower concentrations of contaminants by injection of bacteria and water under pressure. Dead man wells are provided for recovery of contaminated ground water and the organic compounds.

19 Claims, 4 Drawing Sheets

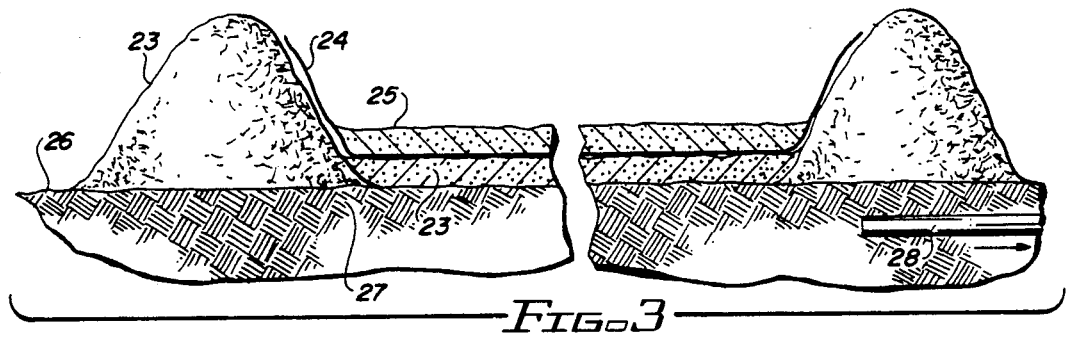
FIG. 3
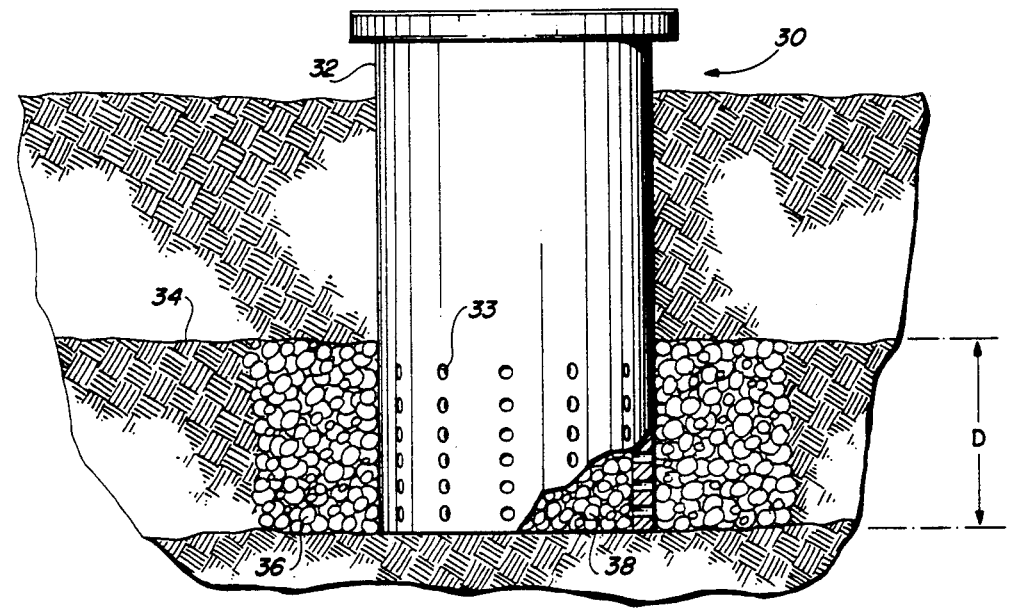
FIG. 4
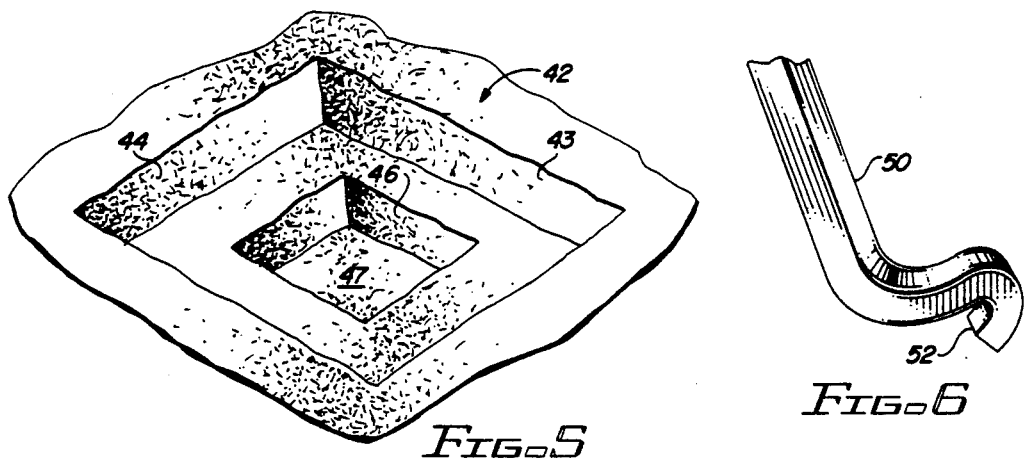
FIG. 5
FIG. 6

METHOD AND APPARATUS FOR CONFINING AND RECLAIMING HYDROCARBON CONTAMINATED LAND SITES

BACKGROUND OF THE INVENTION

The present invention relates to a process for in-situ biodegradation of hydrocarbon contaminated soil, and for containment of the contaminated groundwater to prevent the spread of the contamination. More specifically the invention is an apparatus and process for containing and/or treating groundwater contaminated by an organic compound, such as a petroleum product and for biodegrading in-situ such organic compound, which is contaminating a particulate solid, such as soil.

Under present technologies, ground and groundwater, which are determined to be contaminated by organic compounds such as a petroleum product, are treated through the use of air stripping towers and groundwater withdrawal systems. Generally, a well is drilled into the ground to a depth equal to the vertical extent of contamination. A pump is installed and groundwater is withdrawn from the well and pumped to an above ground air-stripping tower. Pressurized air is pumped into the tower from the bottom and comes into contact with the contaminated water travelling down the tower. The contaminants attach themselves to the air molecules (a function of vapor pressure) and are carried upward into the atmosphere. Treated groundwater is discharged back into the ground for subsequent withdrawal and retreatment or are disposed of off-site. There are two basic disadvantages of air stripping technology.

First, only excessively contaminated soils are typically removed, and residual contamination from the soil can continue to recontaminate the groundwater and prolong air stripping requirements as well as regulatory approvals and delays. Air stripping is only as effective as the ability of the particular soil to release water (and contaminants) from the soil pore spaces, as a result, loose sands can be cleaned with air stripping fairly well, but clays or other loamy sands are not well suited for the air stripping process.

Second, air stripping releases pollutants to the atmosphere, and the pollutant is merely being moved from the water we drink to the air we breathe. Current regulations on air pollution are strengthening due to public pressure. The most obvious air pollutant is smog. When volatiles are released at ground level, sunlight generates photochemical reactions with volatiles and the releases contribute to the formation of smog. Air stripping will require charcoal filtration and liquid recovery in the future as is presently required in California increasing the expense of this technique.

Typical in-situ bioremediation systems, as presently practiced, introduce organisms and/or stimulate indigenous bacteria. This technique can take up to several months depending on the hydrogeological setting. Some of the problems encountered with such bioremediation include following: keeping the bacteria alive until the pollutants reach them, or until they reach the hydrocarbon pollutant which is the food source; the difficulty of controlling oxygen content, nutrient levels and temperature in the field. All three variables are easy to control in the laboratory or in above ground systems, but are difficult to control underground in the field; and monitoring the bacteria degradation rates often becomes difficult. When excess bacteria are introduced, the bacteria become anaerobic and generate methane gas as a waste product. Methane is a combustible gas and large build ups from failed bioremediation attempts have impeded regulatory acceptance to bioremediation.

Bioremediation and biodegradation have been proposed for remediation of hydrocarbon contamination. See, for example, the following U.S. Pat. Nos.: Linn, 3,616,204; Ely et al., 4,765,902; Raymond, 3,846,290; Thirumalachar et al., 4,415,661; Thirumalachar et al., 4,415,662; Lavigne, 4,678,582; Norris et al., 4,849,360; and Hater et al., 4,850,745.

Each of the above mentioned patents suffer from a failure to provide a fully integrated system for the confinement of and reclamation of a hydrocarbon contaminated site.

SUMMARY OF THE INVENTION

The present invention relates to a process for the treatment of hydrocarbon contaminated ground and groundwater to reduce the level of contamination and to contain polluted groundwater. The basic steps of the process are:

(1) Establishing the on-site hydrogeologic characteristics;

(2) Installing veil wells in the direction of flow of the contaminant plume for introduction of hydrocarbon consuming microorganisms, which serve to contain and prevent the further spread of the contaminant plume;

(3) Constructing a land farming area for treating and bioenriching the most severely contaminated soil, i.e. more than 500 ppm of contaminant;

(4) Installing "dead man" devices with gravel packs to be used for the recovery of free floating product if needed due to ground water levels;

(5) Excavating the area of high contamination in a sequential excavation pattern, and placing the excavated material in the land farm area for treatment with bacteria;

(6) Installing horizontal wells for introducing bacteria, water and air into contaminated areas which cannot or will not be excavated;

(7) Installing induction well devices above the water table into the sequential excavation pit for introducing bacteria into areas of contaminated soil and groundwater;

(8) Introducing air pressure into the veil well devices for directing free-floating products toward the dead man devices and/or toward the open checkerboard pit for product recovery with conventional recovery equipment;

(9) Replacing excavated contaminated soils with clean, bioenriched soils generated in the on-site landfarming operation;

(10) "Blowing down" the site by introducing air pressure, bacteria and potable water periodically into veil wells and horizontal wells for continued in-situ degradation; and

(11) Installing monitoring wells for evaluating the effects of treatment.

This process is normally continued until the level of hydrocarbon contamination in the ground and/or groundwater is eliminated or reaches an acceptable level.

The bacteria employed in the present invention is a commercially available high-grease digestant bacteria, such as non-pathogenic bacillus subtilis or ERS Formula 1 which may be obtained from Environmental Bio-Remediation International Corp. The bacteria may be mixed in the field with screenings to assist with the dispersal of the bacteria, in water with a small amount of non-hazardous petroleum product, such as baby oil. The baby oil helps to sustain the viability of the bacteria until it reaches the food source (i.e. the hydrocarbon pollutant). The screenings are by-products of manufacture of aggregate materials. The preferred screenings are light and highly absorbent. The addition of the non-hazardous petroleum product also helps trigger the activity of the bacteria when introduced to the pollutant.

A high degree of hydrocarbon conversion is accomplished in-situ by maintaining adequate supplies of oxygen. Optimum temperatures are accomplished by the introduction of pressurized air through a specially designed well tube and connection fitting. Dry bacteria mix is placed in a veil well to which water is added (approximately 3 to 5 gallons) and air is forced through the tube causing the bacteria to be evenly released. Heat may be generated during the pressurization as a result of the connection fitting which may contain a vibrating reed and a reduction in air line diameter. Oxygen is controlled by the initial burst and subsequent reintroductions of air ("blow downs") into the well pipe.

Methane is controlled by pressure relief valves on the veil wells and induction wells. Methane is a waste product of biodegradation when aerobic bacteria increase to levels where all the available oxygen is consumed. This action causes the aerobic bacteria to be converted to anaerobic bacteria, resulting in a methane by-product being released.

Methane levels are monitored through the veil well. When methane production begins (meaning the point of conversion to anaerobic or the point of high aerobic consumption) a blow down is performed, thereby providing oxygen to stop the conversion of aerobic bacteria to anaerobic bacteria and aerobic degradation continues at a high rate. The introduction of pressurized air through one veil well allows the methane to escape out another veil well on site. Methane levels are thereby kept low and safe, and oxygen levels are kept at an optimum for high degradation.

As will now be recognized, the present invention further overcomes the disadvantages of prior art processes by:

(1) containing the spread of groundwater contamination;

(2) by providing an apparatus and process for recovering floating free product; and (3) by treating excessively contaminated soil to the extent that it qualifies as bio-enriched clean fill. The clean fill can then be returned back to the area of contamination and excess sold as clean fill.

The reintroduced enriched soil still contains active bacteria and continue the process of site rehabilitation in-situ Further, for soils which are only moderately contaminated, the apparatus and process of the invention provide for the in-situ treatment of such soils, to minimize excavation and/or to reach areas where excavation is not possible, such as under a building or a major roadway.

BRIEF DESCRIPTION OF THE DRAWINGS

FIG. 3 is a cross sectional view of a landfarm of FIG. 1 prior to depositing of contaminated soil;

FIG. 4 is a cross sectional view of soil having a dead man device installed therein for collection of ground water and product;

FIG. 5 is a perspective view of an excavation of a square of contaminated soil of FIG. 1 showing the ledge procedure;

FIG. 6 is a tine of a rotary tiller used in treating contaminated soil in the landfarm of FIG. 3;

DETAILED DESCRIPTION OF THE INVENTION

Figure 1:
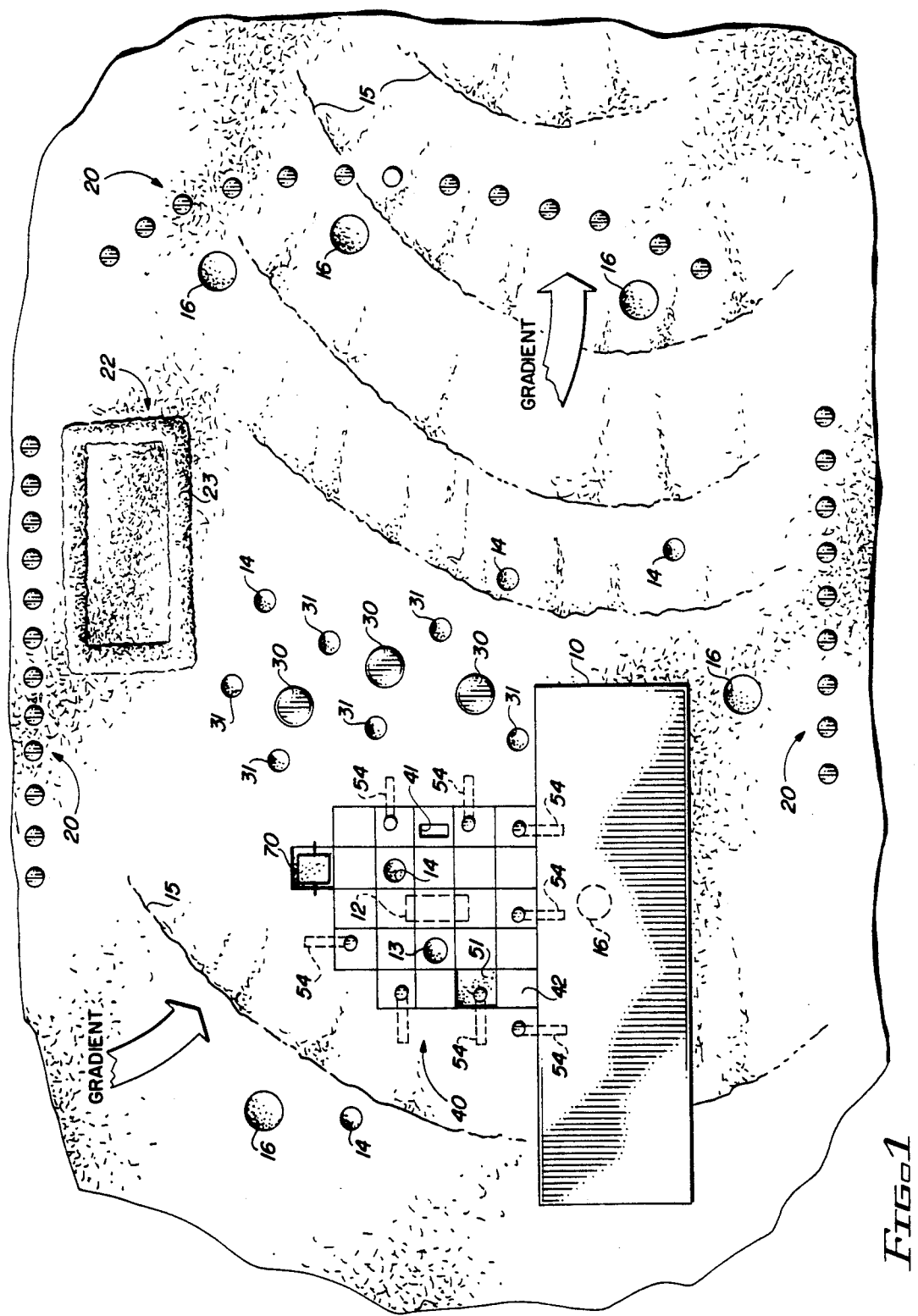
FIG. 1 is a site plan for a typical area contaminated by gasoline, fuel oil or the like showing locations of remediation devices in accordance with the invention.

A typical application of the present invention is in the bioremediation of contaminated soils and groundwater caused by a tank leak of gasoline or other petroleum hydrocarbons at a service station.

The invention will be described with reference to FIG. 1 in a given sequences of steps. Although the procedure described herein is presented in a given sequence, during the actual remediation process, several procedures may be on-going at the same time. Further, depending upon the particular site characteristic, not all steps may be needed.

When contamination from leaking underground storage tank 12 is suspected, an approval and review process for assessing the environmental damage caused from a fuel or other petroleum product discharge is required by the federal government. The procedure is commonly referred to as a contamination assessment. A Contamination Assessment Report is required when a discharge has been discovered or reported.

The first step in a Contamination Assessment Report is to determine if the suspected discharge has in fact occurred and, if so, has it reached the groundwater. To determine this, a monitoring well 13 is installed in the area of the suspected discharge and a water sample is collected. During the drilling process a soil sample can be collected from the cuttings coming up the auger which provides a composite sample over the depth of the well. Alternatively, a split spoon sampling method can be used to collect soil samples from specific depths. The water sample is typically analyzed by conventional means to determine the presence and concentration of a hydrocarbon spill, such as gasoline or diesel fuel. Equivalent conventional tests for soil are also conducted to indicate the presence of a hydrocarbon materials.

If the results of the initial testing indicate the presence of groundwater contamination, the next step is to define the horizontal extent thereof. The term used to define the area of contamination is "plume," and the plume can consist of a free floating fraction on the surface of the groundwater table due to the insolubility of fuel in water and due to the lighter specific gravity, and a dissolved fraction, which is soluble or miscible in water. The floating fraction is referred to as "product."

The two fractions of pollutants will travel at varying rates in the groundwater and both fractions travel as a function of the site specific hydrogeology. To access the hydrogeology and to define the extent of contamination, additional monitoring wells 14 are installed, and the tops of the wells and the horizontal location of the wells are surveyed. Measurements are then made to determine the depth of water from the top of the well casing. The information is used to generate a water contour map 15 which defines the direction and gradient of groundwater flow. After the horizontal extent has been established, a deep monitoring well 16 is then installed, sampled, and analyzed, at one or more locations, to define the vertical extent of contamination.

The analytical data, the flow data and the lithology data are combined with information obtained during on site investigations and research concerning the source and type of discharges. The remaining information needed for a Contamination Assessment Report also concerns regional information such as adjacent land uses, nearby potable water wellfield locations, or surface water bodies and drainage features in the area. All of the information is assembled prior to determining what remedial measures should be taken.

Figure 2:
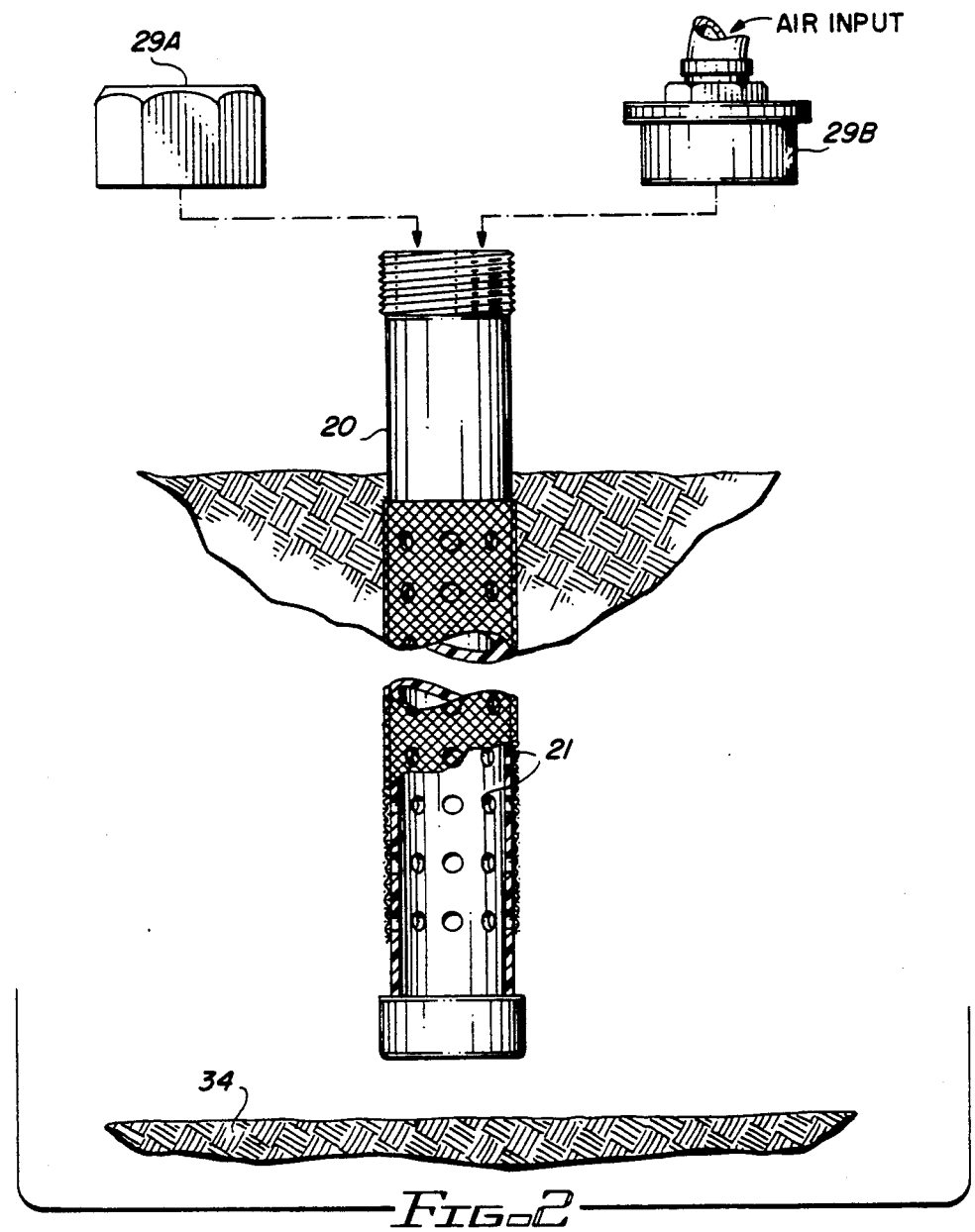
FIG. 2 is a cross sectional view of soil having a veil well, shown partially cut away, installed therein.

After contamination is verified a plurality of containment wells, referred to as "veil wells" 20 is installed. A veil well 20 is shown in FIG. 2. The veil well 20 is designed with perforations and/or slots 21 and is installed into the unsaturated zone of the soil, just above the water table. Once the extent of contamination has been defined during the assessment process, veil wells 20 are installed down gradient of the plume and on surrounding sides of the plume as required to surround the plume. The locations of the veil well curtain is determined from measurements from monitor wells 16. For example, a measurement of 10 ppm to 50 ppm is considered satisfactory for installation of veil wells.

A bacteria mix is prepared using ERS Formula 1 bacteria mixed with absorbent screenings. The bacteria mix is inserted into veil wells 20 in dry form and water is added to fill veil wells 20. Pressurized air in the range of 15 to 25 psi is then used to force the bacteria into the area down gradient of the contamination.

After the lines of veil wells 20 has been installed and bacteria introduced, a literal curtain of bacteria is created. The curtain serves to keep the contamination plume from migrating away from the original source of contamination and possibly affecting off-site third parties.

The spacing and exact locations of veil wells 20 are determined from simple geometric patterns which result in an even spacing. See FIG. 1. Field instrumentation, such as a Foxboro Organic Vapor Analyzer (OVA) or Drager monitoring device, are used to confirm proper and optimum locations.

After the contamination plume is contained on site the location for an on-side landfarm 22 for treating of excavated soil is determined. The landfarm 22, is constructed in an area not already contaminated, but with monitoring wells 16 in place downgradient from the proposed landfarm location to detect possible leakage from the landfarm.

Once a location has been selected, the area is scraped to an even grade 26 and the landfarm 22 construction is begun. A perimeter berm 23 is constructed to prevent stormwater from coming in contact with contaminated soil stored therein and possibly overflowing the landfarm area.

The landfarm 22 uses clean fill for the base and berm construction. Screenings 23 are placed over the base to a depth of about 12 inches with a plastic liner 24 placed over the screenings 23. The screenings 23 act as a cushion in the landfarm to handle the weight of tilling equipment to be used during soil treatment and also act as an absorbent in the event the liner is breached. The liner material may be overlapped with two foot seams between sections depending upon the size of the landfarm. Another 12 inch lift or thickness of screenings 25 is then placed on top of the liner 24. Excavated contaminated soil is to be placed in the landfarm 22 over the second lift of screenings 25. A leachate collection system 28 is also installed in the base of the landfarm to collect any liquids which may be generated in the landfarm 22. As will be recognized, monitoring well 16-1 is down gradient from landfarm 22. During treatment of contaminated soil in landfarm 22, well 16-1 will be continually monitored to detect any leakage from a possible breach of liner 24.

A dead man 30 is shown in FIG. 4 that is used to remove water and product in downgradient areas from the source of contamination. A 24 to 36 inch culvert pipe 32 with perforations 33 in a lower portion thereof is installed vertically into the ground and extending about three feet into the water table 34, indicated by arrows D. Gravel 36 is placed around dead man 30 to allow for the easy flow of water and free product into and through perforations 33. Three feet of gravel 38 is placed in the center of dead man 30 to allow for water and product flow from below the installation. A cover (not shown) is also placed over dead man 30 to prevent accidental or intentional dumping. Dead man 30 is used to recover free product from the surface of the water table. As will be discussed hereinbelow, free product may be directed toward dead man 30 through the manipulation of the water table contours during blow downs on the site.

As noted from FIG. 1, dead men 30 are installed downgradient from the area of maximum contamination. A series of induction wells 31, similar to veil wells 20, is installed adjacent each dead man 30 approximately five to ten feet away. Induction wells 31 are initially used to draw out and recover free product after first installed. After free product is recovered, the wells 31 are used as a conduit for pressurized air and the introduction of bacteria mix. Air pressure of approximately 500 psi is used in a stripping action, to free contamination products trapped in the soils. The duration of application of air pressure is a function of the pore spaces and pore sizes in the unsaturated zone of the soil. Loose sands will allow for more air pressure at longer durations before the soil becomes saturated and a blow back phenomenon occurs in which water is forced back into the well 31.

The air pressure forces the bacteria mix into the surrounding soil to produce the desired bio-degradation of contaminants. The pressure also moves free product and water in the soil toward dead men 30, permitting recovery therefrom.

After the soil is saturated and the air pressure in soil has reached equilibrium, additional air can be introduced to move additional water and product to dead men 30.

After air injection into wells 31 has been completed and free product recovered from dead man 30, the highly contaminated region is excavated for treatment of the soil. The present invention contemplates that a systematic excavation pattern will be followed and testing done throughout the excavation. In the preferred embodiment a checkerboard excavation pattern 40 is used, as shown in FIG. 1.

A single bucket-wide hole 41 is excavated downgradient of the area of contamination as determined by hydrogeological characters. The purpose of the excavation 41 is to recover free product from the directly contaminated area and to permit organic vapor analyzer (OVA) sampling on the sidewalls of the excavation to be performed.

When the OVA registers 500 ppm (parts per million) hydrocarbon or greater, the soil is deemed excessively contaminated. Such excessively contaminated soils with 500 ppm or more are excavated and are processed in the landfarm 22. Soils with lower levels are treated by use of well injections of bacteria mix as discussed hereinafter.

The single bucket wide excavation 41 with OVA testing of the side walls, downgradient of the land farm is performed prior to construction of landfarm 22 and is used to estimate the quantities of soil to be excavated and thus, to determine the size and capacity of the landfarm 22. The OVA testing is also done to determine the number of monitoring well 16 installations, and amount of sampling and analysis required.

The initial excavation is preferably performed in an upgradient square of checkerboard pattern 40, such as square 42. Excavating upgradient of the tank farm is an optimal process for all sites because bacteria mix introduced upgradient flows into the area of contamination prior to the excavation of the source of contamination.

The preferred method of removing heavily contaminated soil in square 42 is shown in FIG. 4, termed a ledge type of excavation, and avoids dewatering the area of excavation. In the ledge excavation process, a large square 43 of about 20 feet by 20 feet is excavated to produce sidewalls 44 of approximately three feet. The next level of excavation 46 is dug to just above the water table 47 and is approximately 15 feet by 15 feet. The optimum size and depth of the excavation is dependent on the level of contamination and site specific characteristics.

The soil excavated from square 42 is deposited in landfarm 22 for treatment when the excavated soil is spread within berm 23, the surface is coated with bacteria mix dissolved in water, and tilled by a specially designed rotary tiller. The tiller has tines 50, as seen in FIG. 5, having flattened back bars 52. This tiller design produces a fluffing of the soil, increasing its absorbance of the liquid bacteria. The action of the bacteria quickly reduces the contamination to the 10 ppm to 20 ppm range.

The cleaned soil from landfarm 40 is then used to construct a dike between the excavation 43 and the next square to be excavated.

Once the second level 46 of ledge excavation is complete on the first excavation 43 and while excavation of a second sequential excavation of square 51 is proceeding, the floor of the first sequential excavation 43 is graded until it is completely level. A six inch layer or lift of screenings is placed on the bottom of excavation 43 followed by a six inch lift of ¾ inch rock. The floor is leveled with a grade stick. The leveling of the floor of the excavation is critical to the process to prevent any particular area from being inundated with too much bacteria during treatment of the excavation.

Next, about ten pounds of dry bacteria mix is distributed over the excavation floor and sprayed with water from a hose. Immediately thereafter, a 12 inch lift of clean fill is placed on top of the rock lift. This procedure traps the victory and starts to create heat, necessary for optimum action of the bacteria.

The above excavation and treatment procedure is continued for a row of squares in area 40 on either side of tank 12. After completion of these squares, tank 12 may be removed.

Figure 7:
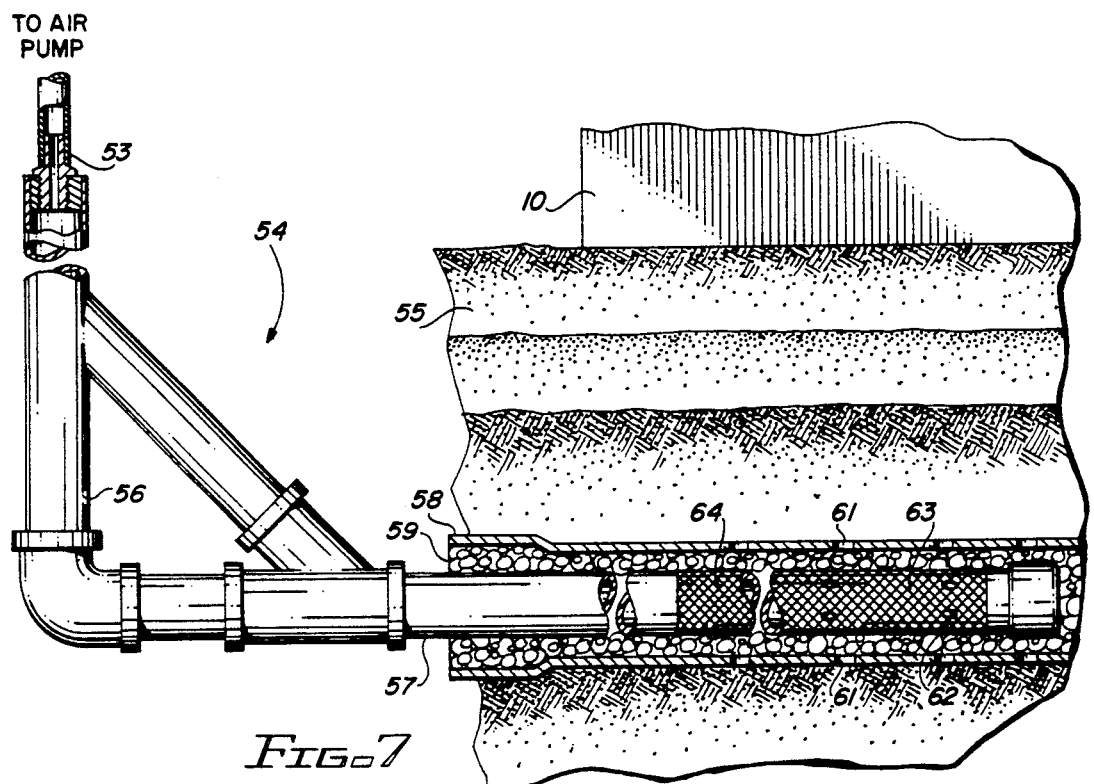
FIG. 7 is a cross sectional view of a building and supporting oil showing a horizontal well installed in the soil.

When the area of contamination is adjacent to a building, such as building 10, it is evident that soil beneath the building will have a high level of contaminants. This soil is treated by the use of low, horizontally disposed wells 54 shown in the cross sectional view of FIG. 7.

Horizontal wells 54 may be installed in the area under building 10. Horizontal wells 54 can treat soils up to 800 ppm of hydrocarbon with adequate success. Beyond 800 ppm more bacteria is required and degradation rates slow considerably. A culvert pipe 58 has a plurality of perforations 61 in its side wall. A horizontal section of tubing 57 is inserted in pipe 58 and surrounded by rock 59. An end section 63 includes perforations 62. A vertical section of tubing 56 includes an air lined fitting 53.

Horizontal section 57 preferably has a 10 degree drop from horizontal. For use under a building, the perforations 61 are placed in the bottom and top of the horizontal pipe. No holes are placed in the sides of the horizontal well under a building, in order to prevent the hole from collapsing and creating voids under the building. Additionally, when the horizontal well is in place, a concrete collar (not shown) is set into place around the pipe. Rebar is set into the concrete to further hold horizontal well 54 in place during the air injection process.

Dry bacteria is placed into horizontal wells 54 in dry form. A horizontal well 54 is filled with water and 500 psi of air pressure is introduced in a single burst to introduce the water, air and bacteria mix. The process is repeated when a blow back occurs. Repeating the process tends to tamp the soil around the horizontal well so more bacteria can be introduced under lower pressures. It is critical that water be used when introducing air pressure into the horizontal well to prevent the pipe from backing out of the hole as the water forms ducts through the soil. Although the horizontal well 54 has been described relative to treating soil under buildings and the like, it may also be used for soil surrounding pattern 40 which may have OVA levels below 500 ppm.

For a horizontal well 54 radiating out laterally from the sequential excavation pattern 40, perforations are placed in the bottom, sides and top of the pipe 61. Where OVA readings are less than 500 ppm less bacteria is required, and lower pressure can be used. The amount of bacteria mix used will depend on the degree of contamination of the site.

Figure 9:
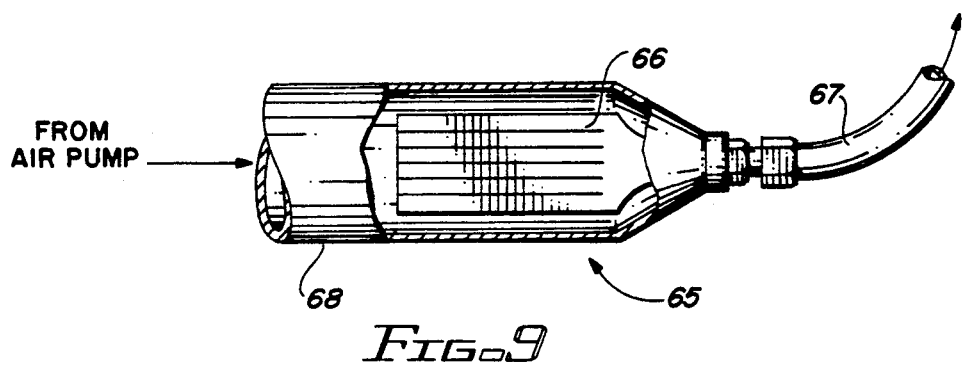
FIG. 9 is a partial and cutaway view of an air manifold used in the process of the invention having a reed for increasing the temperature of air passing therethrough.

An air line fitting 53 is provided at the upper end of tube 56. To treat soil with horizontal well 54, fitting 53 is removed and dry bacteria mix inserted into tube 56. The well 54 is filled with water and air under pressure is introduced via fitting 53. The compressed air is supplied to all wells in the system via a special manifold 65 shown in partial cutaway view in FIG. 9. A body 68 is connected to the source of compressed air. A thin, metallic reed 66 is interposed in the air flow such that fingers cut into reed 66 vibrate causing a significant increase in the air temperature. The heated air exits manifold 65 via a fitting and hose 67 of reduced diameter, increasing the velocity and temperature. Advantageously, the higher temperature accelerates the remediation action of the bacteria.

Horizontal wells 54 are also used in areas which have contamination below 500 ppm which is not economical to excavate. For example, wells 54 are shown in FIG. 1 inserted in the outside walls of excavated squares in pattern 40.

Figure 8:
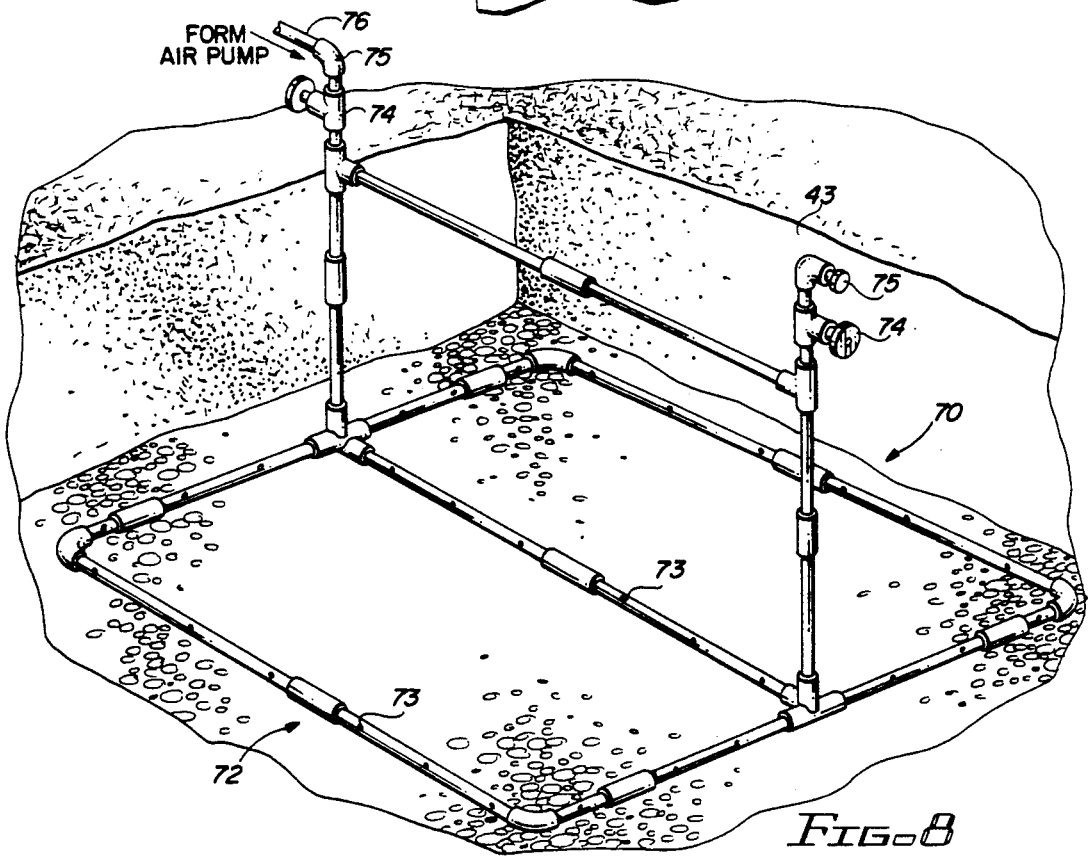
FIG. 8 is a perspective view of an injection well system installed in an excavation.

After installation of respective horizontal wells 54 in the excavation areas, and treatment of each excavation as described above, a special bacteria injection device 70, shown in perspective view in FIG. 8, is used. The device 70 is fabricated from polyvinyl chloride pipe (PVC) and includes input fittings 75 and valves 74. A bacteria injection array 72 may be in the form of a square of PVC pipe having holes 73 along the sides thereof. Array 72 is fed by a pair of vertical pipes connected to valves 74.

The device 70 is lowered into an excavated square of pattern 50 after the described leveling and treatment of the floor. Array 72 is covered with a 12 inch lift of ¾ inch drainfield rock followed by a 12 inch lift of screenings. This allows for good movement of groundwater through the area, allowing the bacteria to move freely through the site. Bio-enriched fill from landfarm 22 is then placed over the screenings up to subgrade level. Bacteria, mix and water are introduced and air, via a manifold 68, previously described, is used to inject bacteria into the contaminated areas for treating any remaining contamination. The second inlet 75 serves to control the pressure in the system, and acts as a relief mechanism. The device 70 is left permanently in the area. If monitoring wells indicate excessing levels of contamination in the future, additional treatment can be provided at minimum cost as discussed below.

As discussed above, when excessively contaminated soils are removed from the area of contamination, they are placed in the onsite landfarm 22 for treatment. The landfarm 22 is being operated concurrently with free product recovery operations, and sequential excavations of area 40. An OVA meter or similar instrument is used to determine when soil is ready to be removed from landfarm 22. When 10 ppm or less is registered on the OVA, the soil is considered to be clean fill. The bio-enriched soil is placed back into the sequential excavation pits. Surplus soil may be sold as clean fill. Commercially, the bio-enriched soil is very good for plant growth, but more importantly the soil is able to be sold and/or reused instead of being hauled and burned.

When bio-enriched soil at 10 ppm to 20 ppm from the landfarm is stockpiled, the bacteria continues to work, and cleans the soil to less than 10 ppm. Potable water is added to keep the pH neutral (7.0) during the landfarming operation.

At the point in the remediation of the site of FIG. 1 when the sequential excavations of pattern 40 have been brought up to subgrade with bio-enriched fill, and closed, the site may be covered with asphalt or concrete and normal business operations can begin on the site again.

Monitoring wells 16 are left located in strategic positions to monitor the effectiveness of the remediation. The bacteria will continue working in the ground to clean the soils and groundwater. Available oxygen is being consumed by the aerobic bacteria left in the ground. When the levels of oxygen get too low, the aerobic bacterial convert to anaerobic bacteria and methane is produced.

Because the wells are still in place and methane is being monitored, air can be introduced as needed to continue the site rehabilitation process and methane is controlled by pressure relief valves on the wells. The air which is introduced may still be heated and if monitoring data warrants, more bacteria mix and water may be added.

While this invention has been described in detail with respect to the preferred embodiment, it will be apparent to one skilled in the art that changes and modifications may be made therein without departing from the scope thereof.

I claim:

1. In an area having soil contaminated with organic compounds in which on-site hydrogeological characteristics are known, including the gradient of groundwater flow, the process of bio-remediation of said soil and containing spreading of contaminated groundwater, comprising the steps of:
   a) disposing an array of veil wells along edges of said contaminated area in the direction of the groundwater flow gradient;
   b) injecting into the array of veil wells microorganisms capable of consuming said organic compounds, and water under pressure to form a curtain of said microorganisms for preventing spread of said organic compounds beyond said area;
   c) excavating soil from regions of heavy contamination within said area;
   d) treating the excavated soil to reduce the concentration of contamination to a predetermined safe level; and
   e) refilling said excavated regions with uncontaminated soil.

2. The process as defined in claim 1 in which:
   said organic compounds are hydrocarbons; and
   said microorganisms are bacteria.

3. The process as defined in claim 2 which includes the step of injecting the bacteria includes mixing said bacteria with absorbent aggregate screenings prior to said injection.

4. The process as defined in claim 2 in which said step of treating the excavated soil includes the steps of:
   selecting a level base;
   constructing a berm around the base;
   lining the berm and base with plastic;
   laying a lift of absorbent aggregate screenings over the plastic; and
   placing the excavated soil within the berm and over the screenings.

5. The process as defined in claim 4 in which said step of treating further includes:
   spreading the bacteria over a surface of the excavated soil within the berm; and
   tilling the surface of the excavated soil to heat and activate the bacteria.

6. In a site having soil and groundwater contaminated by hydrocarbon compounds, a process for bioremediation of the soil and groundwater, and for containing such contamination to the site, comprising the steps of:
   a) determining the hydrogeological characteristics of the site, including the direction and gradient of groundwater flow;
   b) installing an array of veil wells above a water table of the groundwater essentially parallel with the direction of groundwater flow, and laterally downgradient from the site;

c) injecting hydrocarbon-consuming bacteria and water into the veil wells under pressure to saturate soil adjacent thereto, thereby forming a curtain of the bacteria for containing spread of such contamination beyond the site;

d) preparing a landfarm area for storing and treating excavated contaminated soil;

e) excavating soil from areas of heavy contamination within the site;

f) depositing excavated soil in the landfarm;

g) treating the excavated soil in the landfarm with the bacteria to reduce the concentration of contamination to a preselected safe level; and h) refilling the excavated areas with treated soil from the landfarm.

7. The process as defined in claim 6 which includes the further step of:

i) installing dead man wells within the site and extending below the water table for collecting and removing contaminated groundwater.

8. The process as defined in claim 7 which includes the further step of:

j) installing induction wells in the proximity of the dead man wells; and k) injecting air under pressure into the induction wells to force groundwater and contaminants into the dead man wells for collection and removal.

9. The process as defined in claim 8 which includes the further step of:

1) injecting the bacteria, water and air under pressure into the induction wells for bio-remediation of the soil and groundwater.

10. The process as defined in claim 6 in which step a) includes the steps of:

installing a plurality of monitoring wells extending below the water table within the site;

determining the elevation of the water table in each of the monitoring wells;

determining the geographical coordinates of each monitoring well; and plotting the gradient of groundwater flow.

11. The process as defined in claim 6 in which step e) includes the steps of the following:

m) defining an area of soil contamination greater than a preselected concentration;

n) dividing the area into a pattern of contiguous subareas;

o) excavating and bio-remediating the soil of a first subarea;

p) disposing an induction well array in the excavation above the water table;

q) refilling the excavation with the bio-remediated soil; and r) repeating steps m) through q) for each successive subarea.

12. The process as defined in claim 11 in which includes the further step of:

injecting the bacteria and water under pressure into the induction well array for further bio-enriching the soil.

13. The process as defined in claim 6 which includes the further steps of:

installing wells, each having a vertical riser and a horizontal tube, in areas of the site having moderate contamination, wherein the horizontal tube extends below an existing structure; and introducing the bacteria and water under pressure into the vertical risers to bio-remediate soil inaccessible from the areas surfaces.

14. A process for aerobically biodegrading hydrocarbon contaminating compounds in soil and confining the compounds to a selected area, comprising the steps of:

a) establishing hydrogeologic characteristics of the selected area;

b) establishing an extent of hydrocarbon contamination within the selected area;

c) placing veil wells around the area of established hydrocontaminate;

d) installing dead man wells with-in the area to remove floating hydrocarbon material from ground water;

e) placing induction wells in the proximity of the dead man wells;

f) directing ground water toward the dead man wells by applying air pressure into the injection wells;

g) treating the hydrocarbon contaminated soil by the introduction of bacteria, air, and water to biodegrade the hydrocarbon compounds until the hydrocarbon content reaches a predetermined acceptable level;

h) introducing air under pressure into selective areas of contamination to direct the hydrocarbon contamination to site wells for removal of said hydrocarbon compounds from ground water;

i) installing monitor wells in the selected area;

j) continuously monitoring the monitor wells for detection of methane indicating presence of anaerobic bacteria;

k) inserting air into the injection wells to maintain aerobic bacterial action;

l) defining areas of highly contaminated soil by a checkerboard pattern; and m) removing the highly contaminated soil from sequential ones of the checkerboard pattern for bioremediation thereof, and returning the bio-remediated soil to its original location.

15. In a site having soil and groundwater contaminated by hydrocarbon compounds, a process for bioremediation of the soil and groundwater, and for containing such contamination to the site, in which the hydrogeological characteristics of the site, including the direction and gradient of groundwater flow is known, comprising the steps of:

a) determining a borderline of non-acceptable level of contamination of the site;

b) installing an array of veil wells at the borderline and above a water table of the groundwater, the array being essentially parallel with the direction of groundwater flow, and laterally downgradient from the site;

c) injecting hydrocarbon-consuming bacteria and water into the veil wells under pressure to saturate soil adjacent thereto, thereby forming a curtain of the bacteria for containing spread of such contamination beyond the site;

d) determining the areas of concentration of contaminants of soils within the site having a value less than 500 parts per million of contaminants;

e) installing induction wells within such areas; and f) injecting the bacteria and water under pressure into the induction wells for bio-remediation of the contaminated soils.

16. A method for confining an area of hydrocarbon contaminants on a land site having a groundwater flow gradient, comprising the steps of:

disposing an array of containment means adjacent the edges of the contaminated area downstream to the direction of groundwater flow from said contaminated site; and injecting into the array of containment means microorganisms capable of consuming said organic compounds, and water under pressure to form a curtain of said microorganisms along said edge for preventing spread of said hydrocarbons beyond said area.

17. The method for confining an area of hydrocarbon contaminated on a land site as recited in claim 16, further comprising the step of monitoring the groundwater in said area to determine the concentration of hydrocarbons.

18. A method for regulating aerobic bio-remediation of a system that uses microorganisms to treat ground area contaminated with organic compounds, the method comprising the steps of:

positioning a well in the ground adjacent the contaminated area;

providing microorganisms capable of consuming organic compounds and releasing methane gas in accordance with oxygen disposed adjacent said microorganisms;

injecting said microorganisms into said well so that said microorganisms consume said organic compounds in said contaminated area;

injecting a pressurized gas containing oxygen into said well;

removing gas discharged by said microorganisms from said well;

monitoring the content of methane in said gas removed from said well; and controlling the amount of pressurized gas injected in said well in accordance with said monitored level of methane in said removed gas to maintain an aerobic bio-remediation.

19. The method as recited in claim 18 further comprising the step of injecting water in said well with said microorganisms.

* * * * *